United States Patent [19]

Saito et al.

[11] Patent Number: 5,642,257

[45] Date of Patent: Jun. 24, 1997

[54] ATTACHING/DETACHING STRUCTURE FOR A KEYBOARD MODULE IN AN INFORMATION PROCESSING EQUIPMENT

[75] Inventors: Asao Saito, Tokorozawa; Katsutoshi Mukaijima, Hoya, both of Japan

[73] Assignee: Citizen Watch Co., Ltd., Tokyo, Japan

[21] Appl. No.: 524,405

[22] Filed: Sep. 6, 1995

[30] Foreign Application Priority Data

Sep. 6, 1994 [JP] Japan ................................. 6-238436

[51] Int. Cl.⁶ .................................................. G06F 1/16
[52] U.S. Cl. .......................................... 361/680; 400/667
[58] Field of Search .................................... 361/679, 680,
361/681, 683; 364/708.1; 400/682, 667,
676; 312/208.1, 208.3; G06F 1/16

[56] References Cited

U.S. PATENT DOCUMENTS

| | | | |
|---|---|---|---|
| 5,331,508 | 7/1994 | Hohoi et al. | 361/680 |
| 5,443,320 | 8/1995 | Agata et al. | 400/715 |
| 5,490,036 | 2/1996 | Lin et al. | 361/680 |
| 5,510,953 | 4/1996 | Merkel | 361/680 |

FOREIGN PATENT DOCUMENTS

| | | |
|---|---|---|
| 61-60328 | 4/1986 | Japan . |
| 5-289773 | 5/1993 | Japan . |
| 6-60081 | 4/1994 | Japan . |

Primary Examiner—Michael W. Phillips
Assistant Examiner—Lynn D. Feild
Attorney, Agent, or Firm—Lowe, Price, LeBlanc & Becker

[57] ABSTRACT

An attaching/detaching structure for a keyboard module in an information processing equipment for easily mounting, removing and exchanging a keyboard module in a main body of the information processing equipment. For mounting the keyboard module on the body, latch members are pushed into the module. Then, the module is brought close to a concave mounting portion of the main body, with positioning projections in alignment with projection-receiving holes, and the projections are inserted into the holes. After the necessary electrical connection is made, the keyboard module is mounted on the concave mounting portion. Then, the latch members are slid along guide members, using a tool having a portion insertable into a gap between key caps, so that distal ends of the individual latch members are inserted into a corresponding cutout. For detaching the keyboard module, the above procedure is reversed.

6 Claims, 8 Drawing Sheets

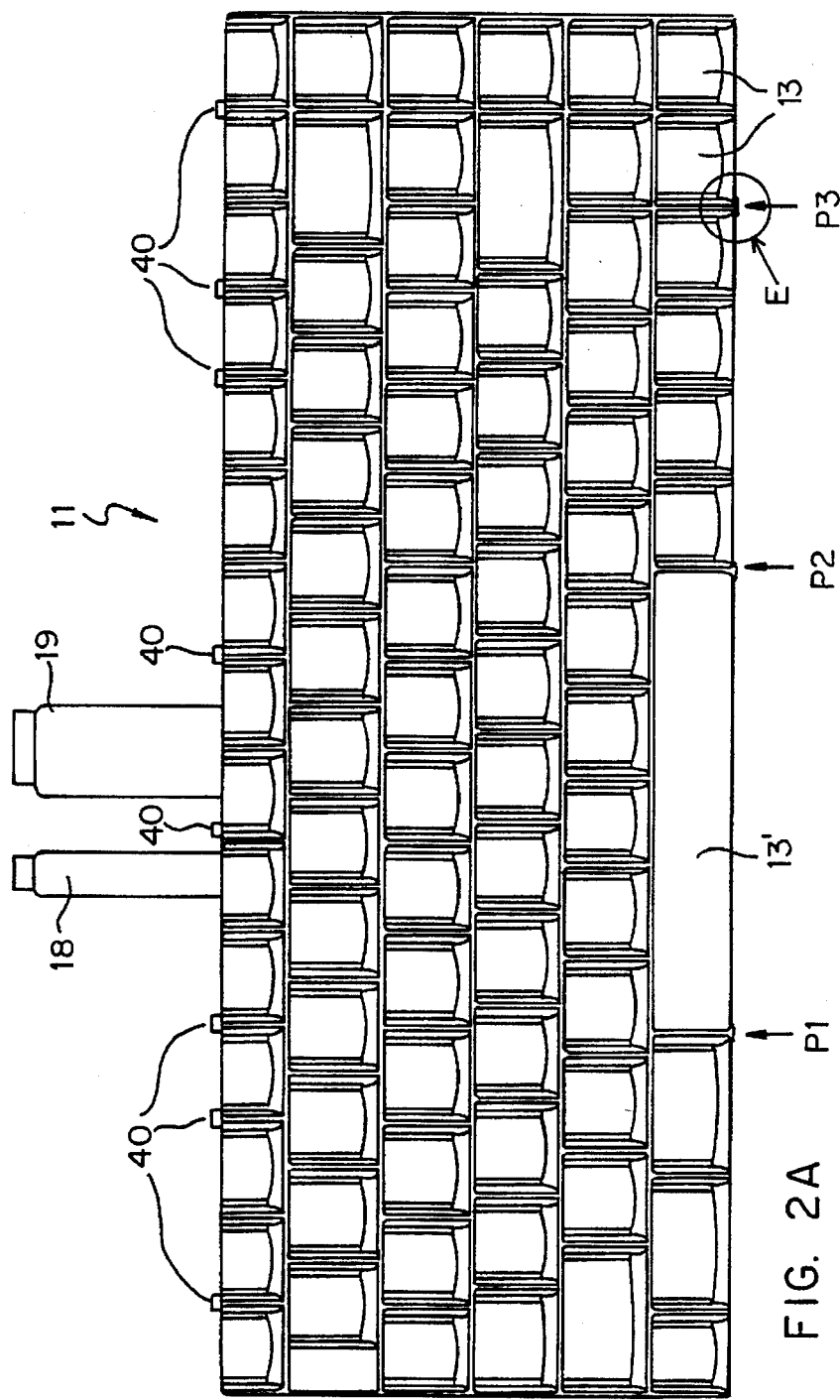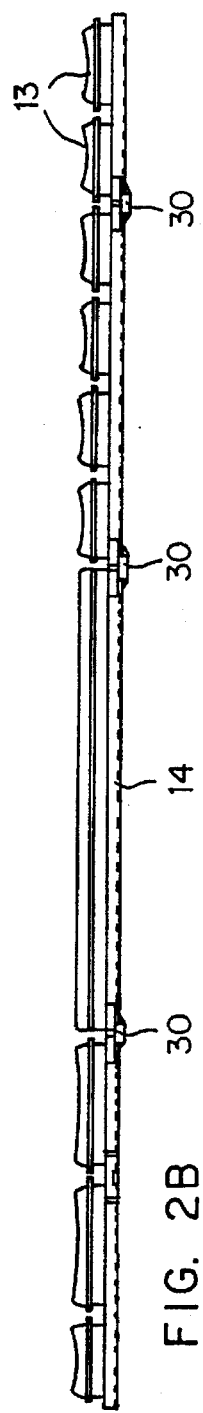

ATTACHING/DETACHING STRUCTURE FOR A KEYBOARD MODULE IN AN INFORMATION PROCESSING EQUIPMENT

BACKGROUND OF THE INVENTION

1. Field of the Invention

This invention relates to an attaching/detaching structure for a keyboard module In an information processing equipment, such as a personal computer or a word processor, and more particularly to an attaching/detaching structure for detachably mounting the keyboard module on a main body of the information processing equipment with ease.

2. Description of Related Art

A known small-size or portable type Information processing equipment such as a notebook type personal computer comprises a main body and a lid member pivotally mounted on the main body. The main body includes a housing for accommodating a processor, a RAM and peripheral circuits, and a keyboard module molted on the housing. In the lid member, a display device such as a liquid crystal display (LCD) is mounted.

When assembling the information processing equipment, disassembling for cleaning, or exchanging the keyboard module, it is necessary to attach and detach the keyboard module on and from the main body housing. Particularly in putting the information processing equipments such as personal computers on the world market, a specification for nationality is frequently changed, so It is very important to facilitate attaching and detaching of the keyboard module.

There is known two kinds of structures for detachably mounting the keyboard module on the main body. With a first structure, the keyboard module is fixed to an upper housing which cooperatively constitutes the main body housing with a lower housing, and the upper housing is assembled with the lower housing. With the second structure, the keyboard module is fixed to posts of the lower housing and is covered by the upper housing. According to either of the known structures, it is necessary to remove the upper housing from the lower housing for attaching and detaching the keyboard module on the main body, to cause a laborious and time-consuming work. This would be a serious problem particularly when exchanging the keyboard modules in a large number of information processing equipments.

SUMMARY OF THE INVENTION

It is an object of the present invention to provide an attaching/detaching structure for a keyboard module in which the keyboard module is easily mounted on and dismounted from a main body of an information processing equipment, such as a personal computer.

Another object of the invention is to provide an attaching/detaching structure for mounting and dismounting the keyboard module on and from the main body without separating the upper housing from the lower housing, thus improving a working efficiency in mounting or exchanging the keyboard module.

According to the present invention, there is provided at least one positioning projection (e.g., positioning pins) on a side of the keyboard module, and at least one slidable latch member on one or more other sides. For example, the positioning projection is provided on a side of the rearmost array of the keyboard arrangement, while the latch member is provided on a confronting side of the frontmost array of the keyboard arrangement. Alternatively, the latch member may be provided at each of opposite sides of the keyboard module, while the positioning projection may be provided at the rearmost or frontmost array of the keyboard arrangement. In another alternative form, the latch member may be disposed at each of all side surfaces of the keyboard module except the side at which the positioning projection is provided.

Each latch member is positioned to be accessible from outside the main body by a tool in the form of a slender rod. Typically, such position is set between adjacent key caps in the frontmost array of the keyboard arrangement. Alternatively, the latch member may be provided in a gap been a terminal key cap in the keyboard array and a periphery of the housing.

It is preferable to form an engaging portion (e.g., an opening or a recess) on each latch member, with which a tip of the slender-rod tool is engageable, but each latch member may be slid by a friction between the tip of the tool and a surface of the latch member. Guide member is provided for guiding each latch member to slide with respect to the keyboard module. There is also provided means for restricting the range of sliding motion of each latch member and retaining it at least two positions (i.e., a retracted position and an engaged position with a cutout). For example, a projection is formed on each latch member, and a recess for receiving the projection is formed at a bottom of the keyboard module or on an inner surface of the guide member.

On the other hand, a concave mounting portion is formed in an upper portion of the main body housing. On the side of the mounting portion, projection-receiving holes are provided for receiving the positioning projections formed in the keyboard module. On a side surface (the periphery of the upper housing) opposite to the side surface on which the projection-receiving holes are provided, there is formed a cutout for receiving the latch member provided on the keyboard module.

With the above structure, the keyboard module is mounted on the main body housing according to the following simple procedure:

(1) Each latch member is pushed into the keyboard module.

(2) With the positioning projections in alignment with the corresponding positioning holes, the keyboard module is brought close to the concave mounting portion. Then, the positioning projections are Inserted into the holes and the keyboard module is electrically connected with a circuit board of the main body.

(3) The keyboard module is placed on the concave mounting portion.

(4) Using the slender-rod tool, the latch members are slid one after another to enter the cutouts in the periphery of the upper housing.

In removing the keyboard module from the main body housing, the foregoing procedure is Just reversed. Either the attaching action or the detaching action can be done quickly in a very simple way. A simple tool having a tip of a slender-rod shape or a tapered shape is adequate for use in sliding the latch member, requiring no specific structure.

BRIEF DESCRIPTION OF THE DRAWINGS

FIG. 2a is a plan view of the keyboard module shown in FIG. 1;

FIG. 2b is a front view of the keyboard module;

FIG. 2c is a side view of the keyboard module;

DETAILED DESCRIPTION OF THE PREFERRED EMBODIMENT

One embodiment of a notebook type personal computer having a keyboard module attaching/detaching structure of the present invention will be described referring to FIGS. 1–7. In the following description, a side near to an operator of the personal computer (the side near a track ball unit) is referred to as "a front side", and a side remote from the operator is referred to as "a rear side".

Figure 1:
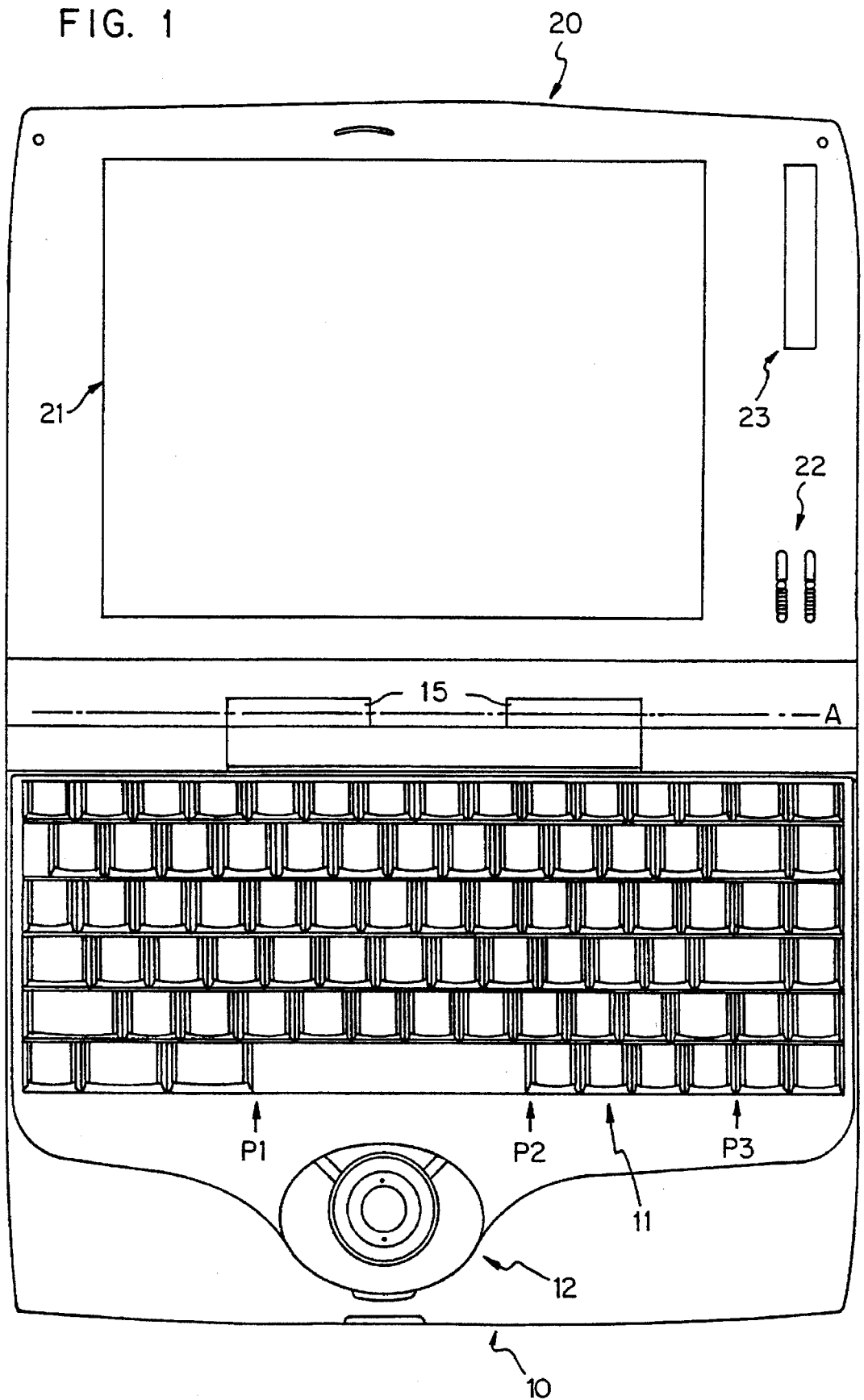
FIG. 1 is a plan view of a notebook type personal computer having a keyboard module attaching/detaching structure according to the present invention.

FIG. 1 shows a personal computer having a main body with a keyboard module mounted on and an opened lid with a display device. A housing 10 of the main body is composed of an upper housing and a lower housing. The keyboard module 11 is detachably attached to a concave portion for mounting a keyboard module, which is formed on a top surface of the housing 10 from a center to a rear side thereof. Arrows P1, P2 and P3 (indicating gaps between key caps of the front most array of the keyboard arrangement) represent disposed positions of the slidable latch members. The keyboard module attaching/detaching structure using the sliding latch members involves the characterizing feature of the present invention and will be described later in detail.

On the front side of the main body housing 10, a track ball unit 12 is provided. Further, the main body housing 10 accommodates a processor, a RAM, a floppy drive unit, peripheral circuits, etc. (not shown).

A lid member 20 has such a shape and size as to substantially overlay the main body housing 10, and a liquid crystal display (LCD) 21 is disposed at an approximate center of the lid member 20. Behind or around a screen of the liquid crystal display 21, a liquid crystal cell, a segment board, a polarizer, a glass pane, a straight tubular discharge lamp, etc. (not shown) are arranged. In addition, on the right side of the liquid crystal display 21, there are provided a screen tuning section 22 for adjusting the brightness and contrast of the liquid crystal display 21, and a small-size auxiliary liquid crystal display 23 for graphically displaying the status of operation of the equipment.

The lid member 20 with the display device and associated parts is pivotally supported at the rear side of the personal computer by a hinge mechanism so as to open and close the lid member 20 with respect to the main body housing 10. In this embodiment, the main body housing 10 has an overhang portion 15 on the rearmost side, and the lid member 20 is pivotally supported by a hinge axle extending through the overhang portion 15 and a lower end portion of the lid member 20 in the direction of width of the personal computer. Reference symbol A represents the axis of the hinge mechanism. Under the hinge mechanism, there is a non-illustrated battery pack.

The attaching/detaching structure for the keyboard module 11 in the personal computer shown In FIG. 1 will be described in detail referring to FIGS. 2a–2e and 3.

As shown in FIGS. 2a–2e, the keyboard module 11 includes a number of keys arranged on a keyboard base 14, each key being covered by a key cap 13. A plurality of slidable latch members 30 are provided at the frontmost side of the keyboard base 14. Several positioning projection 40 are provided at the rearmost side of the keyboard base 14. Membranes 18 and 19 electrically connect the keyboard module 11 with the circuit terminals of the main body of the personal computer. The membranes 18 and 19 are inserted into a non-illustrated connecting unit when mounting the keyboard module 11 on the main body housing, and are drawn out when removing the keyboard module 11 from the housing.

The position P1, P2, P3 of each latch member 30 is set so that the latch member 30 is accessible from outside of the main body by a slender-rod tool. In this embodiment, such positions of the latch members 30 are selected to be a gap between the second and third key caps from the right side in the frontmost array of the keyboard arrangement and a gap between key caps at the opposite sides of a space key 13'.

Figure 2D:
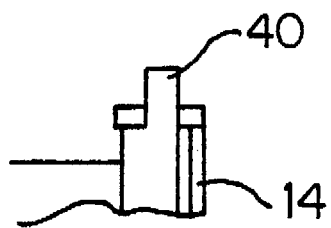
FIG. 2d is an enlarged view of an encircled portion D, showing a positioning projection.
Figure 2E:
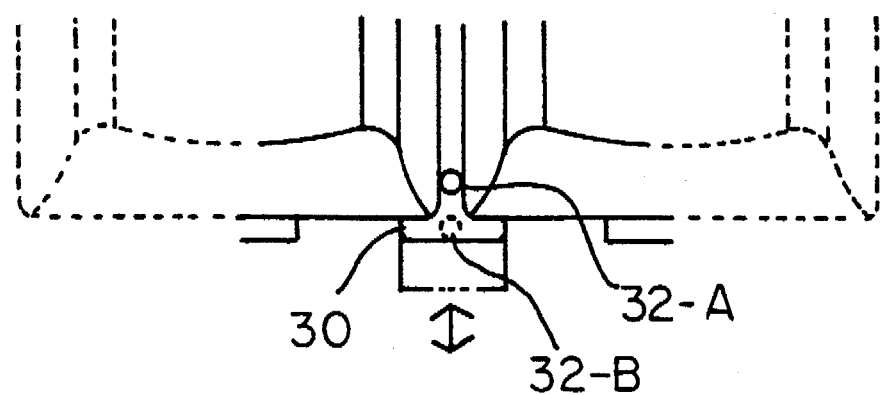
FIG. 2e is an enlarged view of an encircled portion E, showing a latch member.
Figure 3:
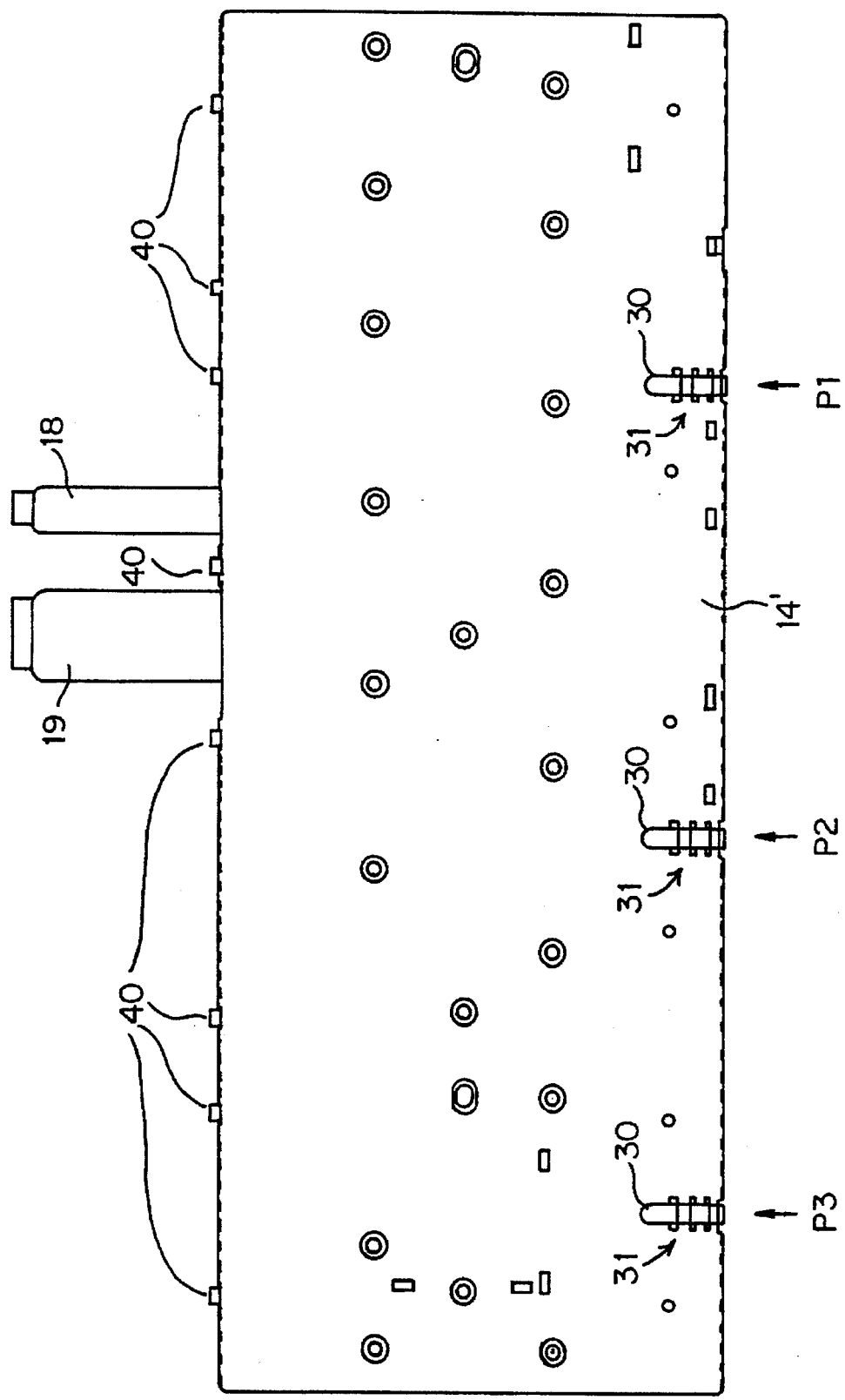
FIG. 3 is a bottom view of the keyboard module.

Particularly referring to FIGS. 2e and 3, each latch member 30 is slidably supported by a guide member 31 formed on a bottom plate (a reinforcing plate) 14' which is attached to the bottom of the keyboard base 14. Each latch member 30 has an engaging portion 32 comprising a recess or an opening, with which a distal end of the slender-rod tool is engageable. In FIG. 2e, the engaging portion 32 is shown as 32-A when the latch member 30 is situated at a retracted position, and is shown as 32-B when the latch member 30 is situated at a projected position.

As described later, when mounting the keyboard module 11 onto the main body housing 10, the engaging portion 32 is moved from the position A to the position B using the slender-rod tool to project the distal end of the latch member 30 from the keyboard base 14.

As not shown in FIGS. 2e and 3, in order to restrict the range of sliding motion of each latch member 30, a projection is provided on the latch member 30 and a device for receiving the projection is provided at the bottom of the keyboard module (FIG. 7).

Figure 4:
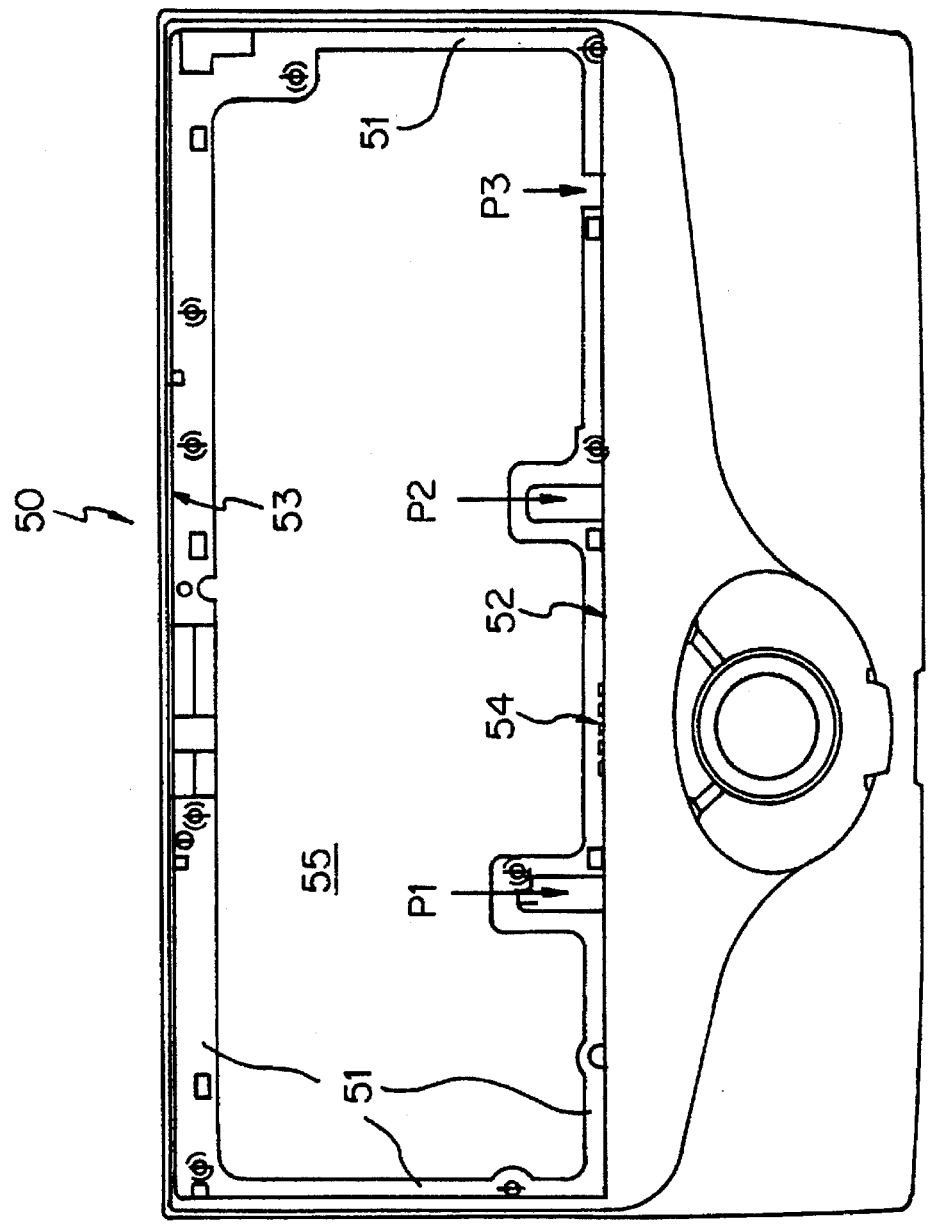
FIG. 4 is a plan view of an upper housing on which a keyboard module mounting portion is formed.

The structure of an upper housing on which the keyboard module 11 to be mounted will be described referring to FIGS. 4 and 5. FIG. 4 is a plan view of an upper busing 50 on which a mount for the keyboard module 11 is formed, and FIG. 5 is a bottom view of the upper housing 50.

Figure 5:
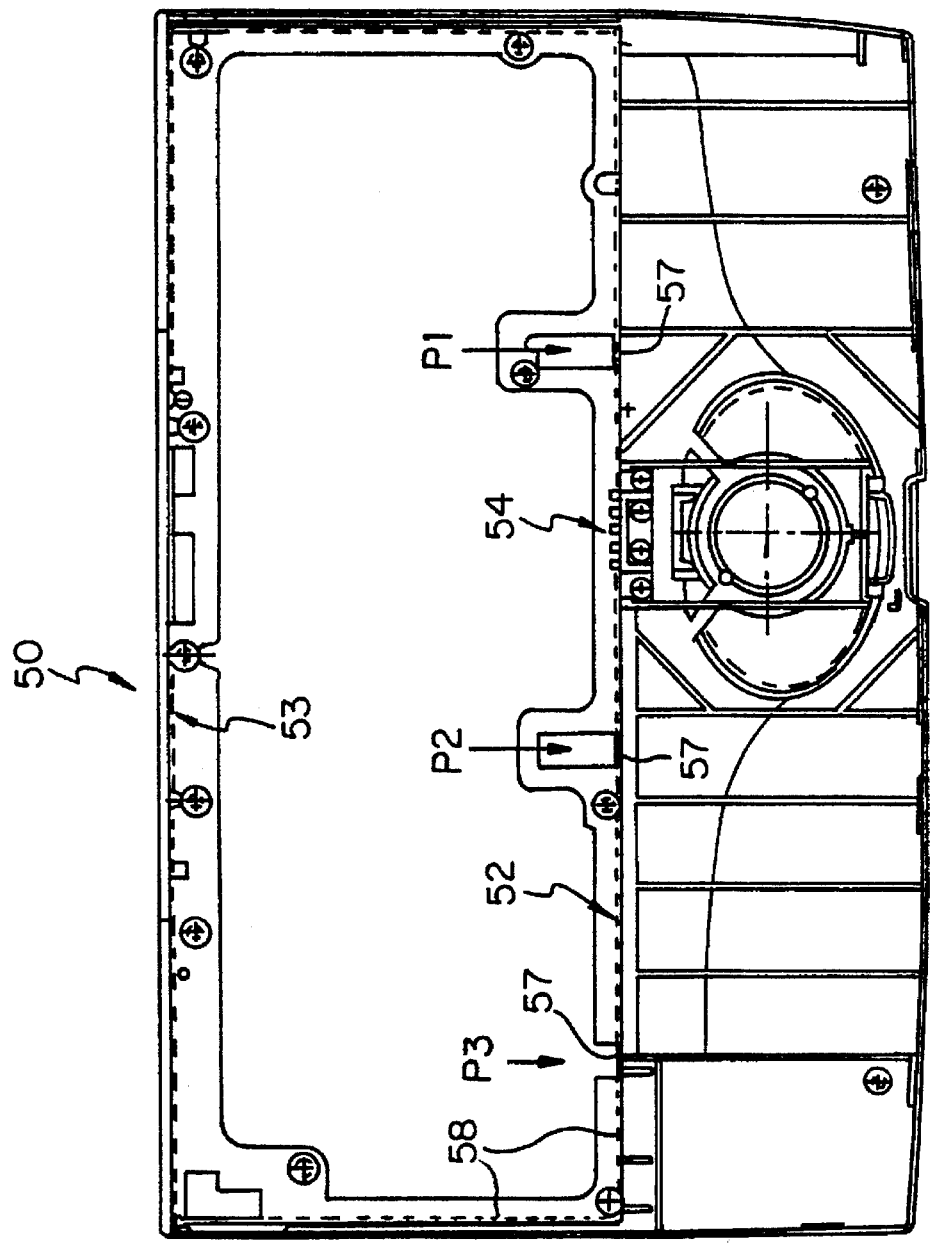
FIG. 5 is a bottom view of the upper housing.

In FIGS. 4 and 5, the upper housing 50 is disposed on a non-illustrated lower housing. The upper housing 50 has a concave portion for mounting the keyboard module, which portion comprises a peripheral member, a front side wall 52 and a back side wall 53. Reference numeral 54 designates a sound emitting portion of a speaker, and 55 designates an opening. Dotted line 58 indicates a position of an outer edge of the keyboard module 11 (the keyboard 14 or the bottom plate (keyboard reinforcement plate) 14') when the keyboard module 11 is attached to the concave mounting portion.

The positions of the latch members are indicated by the respective arrows P1, P2 and P3 likewise in FIGS. 1–3. The front side wall 52 has cutouts 57 for receiving the latch members 30 at positions indicated by arrows P1, P2 and P3. On the other hand, the back side wall 53 has projection-receiving holes (FIGS. 6a–6c) at positions corresponding to the position of projections 40 formed on the keyboard module 11.

The procedure of mounting the keyboard module 11 with the above-mentioned attaching/detaching structure will be described referring to FIGS. 6a–6c, 7a–7b.

Figure 6A:
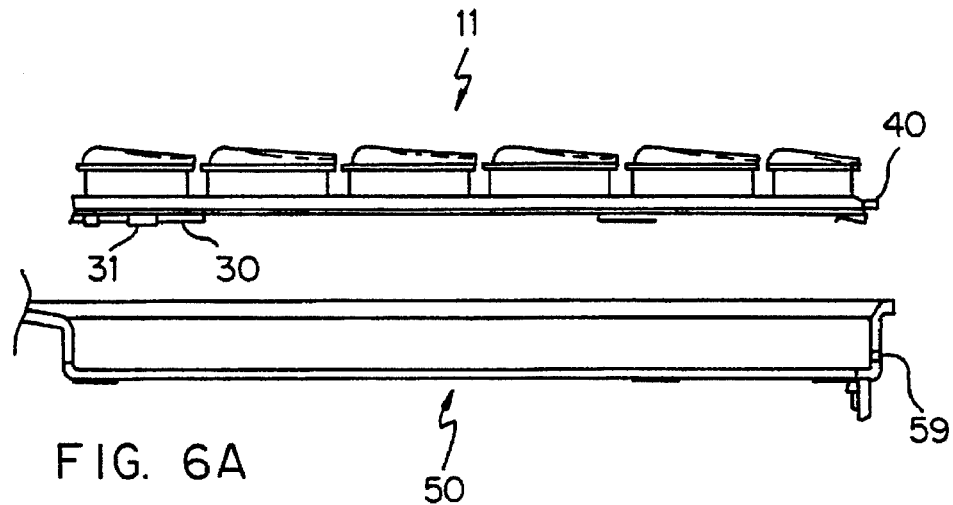
FIGS. 6a–6c are side views showing a procedure for mounting the keyboard module.

Firstly, as shown in FIG. 6a, each latch member 30 provided in the keyboard module 11 is pushed into the keyboard module to take the retracted position.

With the positioning projections 40 in alignment with the projection-receiving holes 59, the keyboard module 11 is brought close to the concave mounting portion. Then the positioning projections 40 are inserted into the respective holes 59 and the keyboard module is electrically connected with the circuit board of the main body. For example, the membranes 18 and 19 (FIGS. 2 and 3) for connecting the circuit terminals of the keyboard module 11 with the circuit board of the main body is inserted into the connectors (not shown) on the circuit board to secure the electrical connection.

Figure 6B:
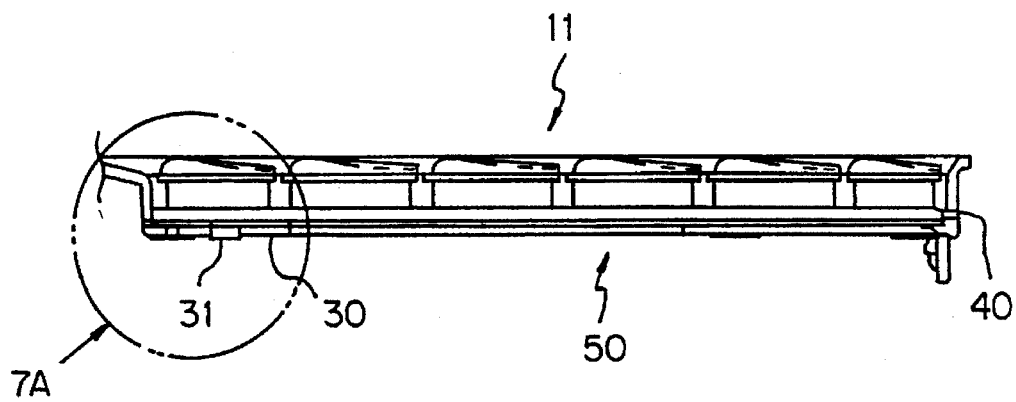
Figure 6C:
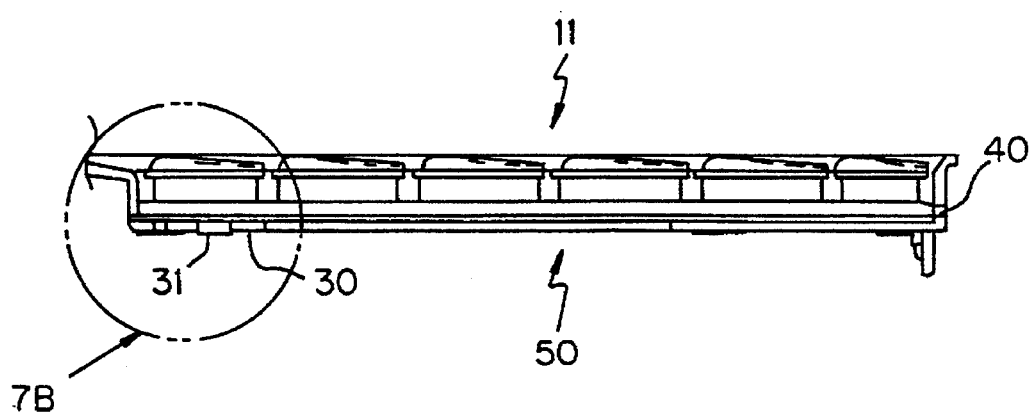

Upon completion of the necessary electrical connection, the keyboard module 11 is placed in the concave mounting portion to in a situation as shown in FIG. 6b. This situation is specifically shown in FIG. 7a which illustrates an enlarged view of the encircled portion 7A of FIG. 6b.

Figure 7A:
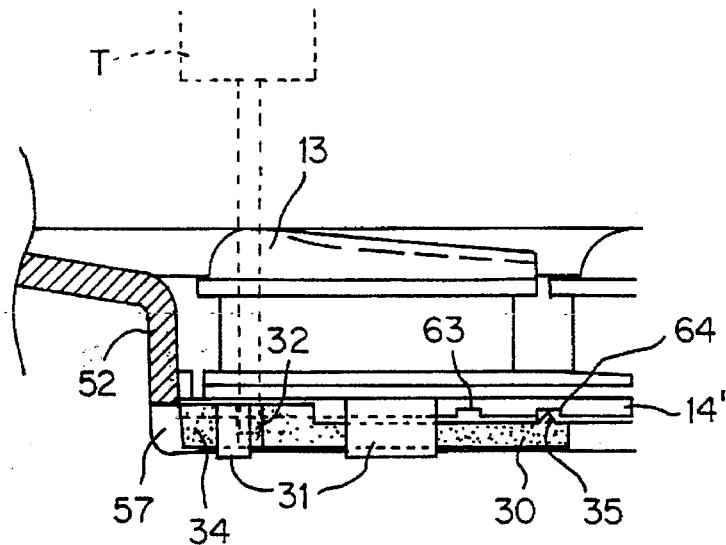
FIGS. 7a and 7b are enlarged views of encircled portions 7A and 7B of FIGS. 6b and 6c, showing the latch member.

As shown in FIG. 7a, a distal end 34 of the latch member 30 is not inserted in the cutout 57 formed in the front side wall 52 of the upper housing. At this time, a locking projection 35 formed on the latch member 30 is engaged with the inner one 64 of two latch retaining portions 63 and 64 (in the form of a recess or opening) provided on the bottom plate (reinforcing plate) 14', and the latch member 30 is at the retracted position.

With this retracted position, a tool T (e.g., a pin-shape member) having a distal end insertable into a gap between key caps through a length at least as long as the height of the key cap 13 is brought into engagement with an engaging portion 32 at the position A and the latch member 30 is slid to the left side in the figure along the guide member 31 to insert the distal end 34 of the latch member 30 into the cutout 57. This situation is shown in FIG. 7b which illustrates an enlarged view of an encircled portion 7B of FIG. 6c.

Figure 7B:
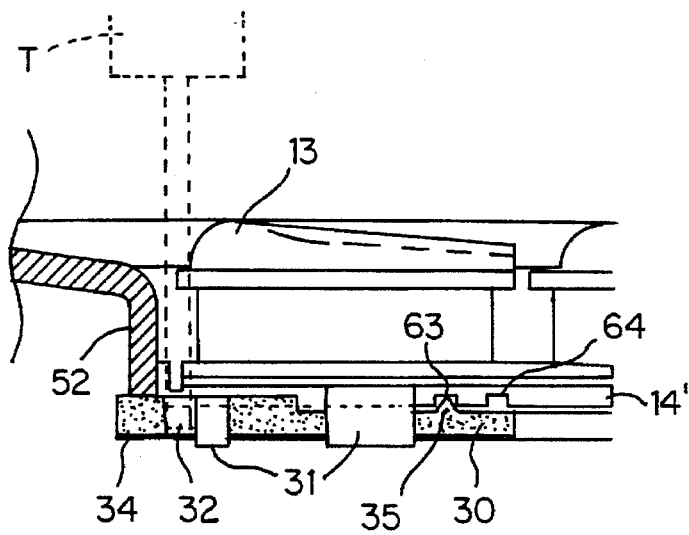

As illustrated in FIG. 7b, In this situation, the locking projection 35 on the latch member 30 is engaged with the outer one 63 of two latch retaining portions 63 and 64 provided on the keyboard bottom plate 14'. Therefore, the latch 30 is kept stable in the engaged position, so that it is not be returned to the situation of FIG. 7a by the expected impact or vibration in the ordinary use. When the distal ends 34 of all the latch members 30 are inserted into the cutouts 57, the keyboard module attaching procedure Is completed.

When detaching the keyboard module 11, the foregoing procedure is reversed. The detaching procedure is described as follows:

Firstly, using the slender-rod tool T, latch members 30 are slid one after another to be removed from the cutouts 57 to be in a situation of FIGS. 6b and 7a. Then, the keyboard module 11 is raised from the concave mounting portion and the electrical connection with the circuit board of the main body is cut off. For example, the membranes 18 and 19 of the keyboard module 11 is removed from the connector on the circuit board. Also the positioning projections 40 are removed from the projection-receiving holes 59. Finally, the keyboard module 11 is moved away from the mounting portion to finalize the detaching procedure of the keyboard module 11.

In the foregoing embodiment, the positioning projections are provided on the rear side of the keyboard module. Alternatively, they may be provided on any one of the other three sides. Further, the latch members can be located at any side of the keyboard module, other than the side on which the positioning projections are provided. For example, the positioning projections may be provided either on the rear side or the front side of the keyboard module, and the latch members may be provided on the other opposite sides of the keyboard module. Still further, the latch members may be provided on three sides of the keyboard module, and the positioning projections may be provided on the remaining one side.

The number of latch members is preferably at least two so as to mount the keyboard module stably. It is however preferably to reduce the number of latch members as less as possible to facilitate attaching and detaching procedure (one at minimum). In general, the number of latch members is determined to be optimum in view of material strength of the latch members and guide members. Similarly, it is preferable to determine the number of the positioning projections in due consideration of material strength, operating efficiency, etc.

Further, in the above embodiment, the latch members are provided at positions (E–G) between the key caps. Alternatively, one or more latch members may be positioned between the key cap and the housing side wall.

Various changes may be suggested in position and number of the latch members and positioning projections.

Further, the position and number of the cutouts and projection-receiving portions are determined in dependence on the variations of position and number of the latch members and positioning projections.

According to the present invention, such a laborious procedure is not required as to remove a component (an upper housing) of the main body housing of the information processing equipment and to assemble the same when mounting or removing the keyboard module on or from the main body housing. Therefore, it is possible to improve the working efficiency particularly when assembling or changing keyboard modules of a large number of information processing equipments. Further, as the structure is simple and does not require any special tool in attaching and detaching the keyboard module, it does not cause an increase of manufacturing cost and is advantageous in economy.

What is claimed is:

1. A keyboard module in combination with an attaching/detaching structure for detachably mounting the keyboard module on a main body of an information processing equipment using a tool in the form of a slender rod, comprising:

a main body housing having a concave mounting portion in which said keyboard module is mounted;

at least one positioning projection provided at one side portion of said keyboard module;

at least one slidable latch member provided at one or more side portions other than said one side portion of said keyboard module, said latch member being disposed at such a position as to be accessible from outside of said main body by the tool in the form of a slender rod;

a projection-receiving hole provided on said mounting portion at a position corresponding to the position of said positioning projection, for receiving said positioning projection; and a cutout provided on said mounting portion at a position corresponding to the position of said latch member, for receiving said latch member;

wherein said latch member is slidable between a first position in which said latch member is in engagement with said cutout of said mounting portion and a second position in which said latch member is out of engagement with said cutout.

2. The combination according to claim 1, further comprising an engaging mechanism for engaging said latch member with said keyboard module at each of said first and second positions.

3. The combination according to claim 1, wherein said positioning projection is arranged at a rearmost side of said keyboard module, and said latch member is arranged at a frontmost side of said keyboard module.

4. A keyboard module in combination with attaching/detaching structure for detachably mounting the keyboard module having a plurality of key caps on a main body of an information processing equipment using a tool in the form of a slender rod, comprising:

a main body housing having a concave mounting portion in which said keyboard module is mounted;

at least one positioning projection provided at one side portion of said keyboard module;

at least one slidable latch member provided at one or more side portions other than said one side portion of said keyboard module, said latch member being disposed at such a position as to be accessible from outside of said main body by the tool in the form of a slender rod;

a projection-receiving hole provided on said mounting portion at a position corresponding to the position of said positioning projection, for receiving said positioning projection; and a cutout provided on said mounting portion at a position corresponding to the position of said latch member, for receiving said latch member;

wherein said latch member is slidable between a first position in which said latch member is in engagement with said cutout of said mounting portion and a second position in which said latch member is out of engagement with said cutout, and disposed at a position corresponding to a gap between adjacent key caps of said keyboard module.

5. The combination according to claim 4, further comprising an engaging mechanism for engaging said latch member with said keyboard module at each of said first and second positions.

6. The combination according to claim 4, wherein said positioning projection is arranged at a rearmost side of said keyboard module, and said latch member is arranged at a front most side of said keyboard module.

* * * * *